Aug. 27, 1968  E. J. STRANG  3,398,777
STOP LIMIT MEANS FOR POWER OPERATED TIRE CHANGER
Filed June 27, 1966
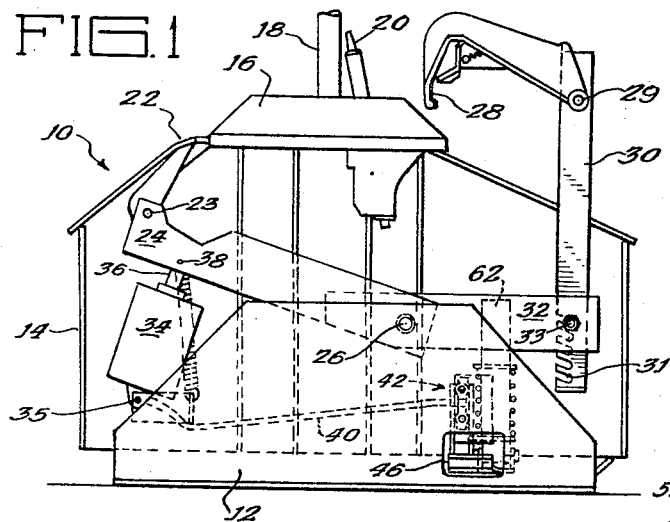
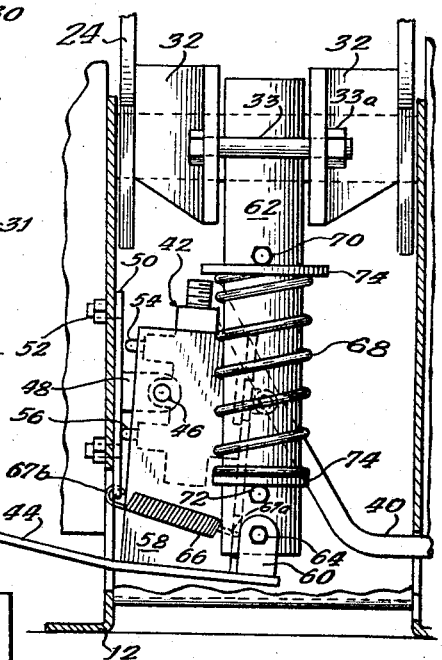
Inventor:
Elmer J. Strang
By: Hofgren, Wegner, Allen,
Stellman & McCord
Attorneys

United States Patent Office 3,398,777
Patented Aug. 27, 1968

3,398,777
STOP LIMIT MEANS FOR POWER OPERATED TIRE CHANGER
Elmer J. Strang, Fort Dodge, Iowa, assignor to The Coats Company, Inc., a corporation of Iowa
Filed June 27, 1966, Ser. No. 560,753
7 Claims. (Cl. 157—1.28)

ABSTRACT OF THE DISCLOSURE

Stroke limiting means for use in tire changing stands having bead breaker shoes mounted on arms connected to motor means for moving the arms, the motor means being connected to a control means intermediate the motor and the source of power for the motor, characterized in that the control means is manually or pedally movable between a power supply and a power off position and connected to a member which intersects the path of travel of a bead breaker shoe arm, so that after a predetermined amount of travel, the arm will assert a force on the member tending to move the control means toward the power off position in opposition to the operator effort necessary to hold the control means in the power supply position.

---

This application relates to tire changing apparatuses and more particularly to a new and improved means for limiting the stroke of the head breaker shoes of a tire changing apparatus.

One problem in attempting to provide a tire changing apparatus which is universal for most types of automobile and motorcycle wheels is that with narrow rims, such as are found in many European cars, and also in larger motorcycle wheels, the bead breaker shoe need travel only a short distance relative to the axis of the rim in order to loosen the bead of the tire side wall and push the bead into the drop center of the rim. However, the bead breaker shoe is usually mounted for movement through a path which will accommodate wider rims of the same diameter as found in most domestic vehicle wheels. Whereas domestic wheels generally have fourteen or fifteen-inch rims which may be six or seven inches wide, foreign wheels fifteen or sixteen inches in diameter may be only two and one-half to three and one-half inches wide. If the shoe is allowed to travel for its full normal stroke, there is a strong possibility that the shoe will push against the opposite side of the narrow rim and thereby cause a distortion in the configuration of the rim.

Thus it has become desirable to provide a means for limiting the stroke of bead breaker shoes of a tire changing apparatus. However, a further desirable feature of such a limiting means is that it should have the capability of overriding the original means for limiting the path of travel of the bead breaker shoe in order that further stroke, if necessary, may be imparted to the shoe, under the watchful eye of the machine operator.

It is therefore a primary object of this invention to provide a stroke limiting means for a power operated tire changer.

It is another object of this invention to provide a means for limiting the stroke of a bead breaker shoe of a power operated tire changer so that the tire changer may be utilized for changing tires on narrow rims.

Yet another object of this invention is to provide a novel stroke limiting means for a power operated tire changer, which stroke limiting means may be overriden by the machine operator if particular conditions require further stroke to me imparted to the bead breaker shoe.

Yet another object of this invention is to provide a new and improved stroke limiting means for a power operated tire changer which operates directly against the machine operator's force for actuating the machine and wherein additional force must be imparted by the operator in order to override the limit imposed upon the bead breaker shoe by the means of this invention.

Still a further object of this invention is to provide a new stroke limiting means for a power operated tire changer wherein a member is provided in the path of travel of the arm supporting the bead breaker shoe, the member being directly connected to the operator control so that movement of the arm on which the bead breaker shoe is mounted is directly translated into force opposing the operator's control force.

Other objects, features, and advantages of the present invention will be apparent from the following description of the preferred embodiments illustrated in the accompanying drawings, in which:

FIGURE 1 is a side elevational view of a tire changing apparatus embodying the stroke limiting means of this invention with the cover panels of the tire changing apparatus removed for clarity of illustration;

FIGURE 2 is a fragmentary enlarged side elevational view of the lower right-hand portion shown in FIGURE 1 showing the stroke limiting means of this invention in greater detail;

FIGURE 3 is a fragmentary enlarged end view of the lower right-hand portion of FIGURE 1, generally in vertical section, showing the position of the relative parts of the stroke limiting means of this invention when the tire changing apparatus is not actuated; and FIGURE 4 is a view similar to FIGURE 3 showing the relative position of the component parts after the tire changing apparatus has been actuated.

The tire changing stand generally indicated 10 in FIGURE 1 is similar to the apparatus disclosed in Strang et al. application, Ser. No. 382,874, filed July 15, 1965, entitled, "Tire Changing Stand," and assigned to the assignee of this invention, now Patent No. 3,255,800, issued June 14, 1966.

The stand includes a frame 12 for supporting various working components of the tire changer and wall structure indicated 14 for enclosing the operational components and masking the same from view. The top of the stand includes a supporting surface 16 for supporting a vehicle rim during tire removal and replacement, and a rotating tire tool shaft 18. Pin 20 projects upwardly from surface 16 for insertion through the bolt hole in the rim of a vehicle tire for mounting a wheel on the stand.

The tire changer 10 further includes a lower bead breaker shoe 22 positioned on one side of the stand and pivoted at 23 to a bead breaker arm 24 which is pivoted to the frame at 26 for moving the bead breaker through a generally upward path or stroke to loosen the tire bead from a vehicle rim. The other side of the tire changer is provided with a diametrically opposite upper bead breaker shoe 28 which is pivoted at 29 to a post 30. Post 30 is provided with notches 31 at its lower end for engagement with an arm means comprising a pair of spaced arm members 32 tied together by a bolt 33 and nut 33a. The arm means is also pivoted at 26 for movement through an arcuate path to move the upper bead breaker shoe through a generally downward path or stroke for breaking the bead of the opposite side wall of a tire loose and pushing the bead towards the center of a vehicle rim.

Motor means are provided for moving the arms upon which the bead breaker shoes are mounted to move the bead breaker shoes through their bead breaking and separating path. Preferably this motor means takes the form of a piston and cylinder device 34 pivoted to the tire changer at 35. Piston and cylinder device 34 includes the usual linearly extensible piston rod 36 which is pivoted to arm 24 at 38 so that extension and retraction of rod 36 relative to cylinder 34 rocks arms 24 and 32 about their pivotal mounting 26 to move the lower and upper bead breaker shoes through a bead breaking stroke and return the same to an at-rest position as shown in FIGURE 1 and as described in my aforementioned co-pending application.

Preferably cylinder 34 is a pneumatically operated cylinder, to take advantage of the usual ready supply of compressed air at most service stations, garages and the like. A conduit or air line 40 extends to cylinder 34 from a control means or valve 42. Valve 42 may be controlled by foot pedal 44 for selectively supplying power in the form of fluid under pressure to cylinder 34 responsive to operator actuation of pedal 44.

Control valve 42 is pivoted at 46 to a bifurcated bracket 48 which projects inwardly from one side wall of the machine from a mounting plate 50 secured to frame 12 by suitable fasteners 52. The valve includes an inlet or supply poppet 54 and an outlet or exhaust poppet 56. When the tire changer 10 is at rest, the valve is in the position shown in FIGURE 3 with the outlet poppet 56 open, that is, forced against mounting plate 50 so that the valve is in a valve exhaust position wherein no air under pressure is supplied to the piston and cylinder device 34.

Valve 42 is also secured between a pair of spaced upright plates 58 which, at their lower ends, are each secured to the portion of pedal 44 which projects interiorly of the tire changer 10. When an operator wishes to actuate valve 42, he may depress pedal 44, preferably with the application of foot pressure, causing valve 42 to pivot about its mounting 46. This will remove poppet 56 from engagement with mounting plate 50 and bring poppet 54 into engagement with mounting plate 50 to open inlet poppet 54 and thereby supply air under pressure to the piston and cylinder device 34. As previously mentioned, the application of air under pressure to piston and cylinder device 34 causes the piston rod 36 to extend and impart movement to arms 24 and 32 to thereby move the lower and upper bead breaker shoes through their bead unseating stroke.

Pedal 44 is provided with an upwardly extending bifurcated bracket 60 at one side of its inner end for pivotal securement of the pedal to upright or guide member 62 about a pivotal mounting 64. A return spring 66 is mounted at one end 67a to the pedal bracket 60 at the other end 67b to the frame 12, normally urging the pedal and valve 42 to an inoperative or valve exhaust position. Thus when an operator removes operating force, such as foot pressure, from the top of pedal 44, spring 66 will return the valve 42 to the position shown in FIGURE 3.

A spring 68 is telescoped about member 62 and held adjacent the lower end of the member between upper bolt 70 and lower bolt 72. Collars 74 are positioned about member 62 between bolts 70 and 72 and the top and bottom of spring 68. Generally collar 74 is of a dimension to be engaged by the arms 32 as the arms move downwardly in their path of travel about pivot 26 responsive to actuation of the machine and movement imparted by piston and cylinder device 34.

In operation, after a vehicle tire has been positioned upon the tire supporting surface 16, the operator of the tire changer may actuate the lower and upper bead breaker shoes to break the tire bead loose from the vehicle rim by depressing foot pedal 44. Depression of this pedal will cause valve 42 to pivot about mounting 46 so that exhaust poppet 56 is rendered inactive and inlet poppet 54 is actuated to supply air under pressure to cylinder 34. This, in turn, will cause rod 36 to pivot arms 24 and 32 about mounting 26, thereby moving bead breaker shoes 22 and 28 through a bead breaking stroke.

During the actuation of the bead breakers, arm 32 moves downwardly and will move to a position where it engages collar 74 above spring 68. As the upper bead breaker shoe further moves through its bead breaking stroke, arm 32 will advance to a position generally shown in FIGURE 4 where it bears against the collar 74 and compresses spring 68. This will produce an increased force in member 62 in opposition to the force applied by the operator to pedal 44. Unless the operator increases the force he is applying to foot pedal 44, the force of arm 32 on spring 68 will pivot valve 42 to the exhaust position with the valve and foot pedal assuming the position shown in FIGURE 3.

It is intended that the position of arms 32 relative to collar 74, the strength of spring 68, and the relative positioning of the other components of this invention, would be such as to cause the normal pedal depressing force to be overcome at a point in the path of travel of the bead breaker shoes when they have traveled a distance generally sufficient for loosening tire beads from narrower vehicle rims. If the tire changer 10 were being utilized to service larger vehicle tires and rims, the operator could overcome or override the counter force imposed on foot pedal 44 by exerting a heavier force on the pedal itself. In this manner, narrow rims will be protected from damage in that when the bead breaker shoes have traveled a distance normally sufficient for loosening the tire beads from the narrow rims, the operator will receive a physical signal manifested in the overpowering counterforce on the foot pedal. However, the operator, if servicing larger vehicle tires and rims, can override the counterforce and continue the stroke of the bead breaker shoes to the completion of the bead breaking operation.

This invention provides a means for limiting the movement of bead breaker shoes of a tire changer so that damage to narrower rims may be avoided. The nature of the stroke limiting means is such that the operator may override or overcome the influence of the stroke limiting means, but only after he has received a physical manifestation of the fact that the bead breaker shoes have traveled a predetermined distance to a point wherein care should be exercised before allowing further travel of the shoes. The limiting means is functionally intermediate the path of travel of the bead breaker shoes, and the means for actuating the bead breaker shoes so that a direct positive relationship and action is afforded. Full advantage is taken of existing structure and methods of operation of the tire changer so that only minor changes and little additional equipment are necessary for adapting previously known similar tire changers for the reception of the stroke limiting means.

The foregoing detailed description has been given for clearness of understanding only, and no unnecessary limitations should be understood therefrom, as some modifications may be obvious to those skilled in the art.

I claim:

1. In a tire changing apparatus including a frame for supporting a vehicle rim in a position for removal of the tire beads of a vehicle tire secured on the rim, bead breaker shoe arm means movably mounted on the frame, bead breaker shoes mounted on the bead breaker arm means for movement through a path of travel for separating the tire bead from the vehicle rim, motor means for moving the bead breaker shoe arms through a bead loosening stroke said motor means being connected to a source of power, means for limiting the stroke of bead breaker shoe relative to the vehicle rim, comprising: control means interposed between the power source and the motor means, said control means being normally held in a closed position and being movable to an open position to supply power to the moving means; a member mounted in the path of travel of the bead breaker arm means and connected to the control means to move the control means to a closed position when the bead breaker arm means has traveled a predetermined distance corresponding to the travel of the bead breaker shoe relative to the vehicle rim, thereby terminating the supply of power to the motor means and movement of the bead breaker arm means to limit the stroke of the bead breaker shoes relative to the rim.

2. The tire changing stand of claim 1 wherein said control means has a portion projecting exteriorly of the frame for engagement by the operator for moving the control means to an open position supplying power to the moving motor means, and wherein movement of the bead breaker arm moves said control means towards the closed position in a magnitude of force in excess of the force originally required by the operator to move the control means to the open position.

3. The tire changing stand of claim 2 wherein said control means is a valve pivoted to the frame for movement from an at-rest, valve exhaust position and an activated, valve supply position.

4. The tire changer of claim 3 wherein the projecting portion is a pedal which is directly connected to the valve for movement in one direction to pivot the valve to a valve supply position, and wherein said member is connected to the pedal and positioned in the path of travel of the bead breaker arm so that as the arm travels, the member receives forces from the bead breaker arm in opposition to the forces imparted by movement of the pedal to operate the valve, an increase in the amount of arm travel resulting in an increase in the amount of force applied to the member in opposition to the force imposed upon the pedal by the operator until the initial pedal moving force is overcome.

5. The tire changer of claim 4 wherein a spring is connected to the member for nondistorting movement of the spring responsive to movement of the member by actuation of the pedal, said spring further being associated with the bead breaker arm for distorting movement of the spring responsive to movement of the arms to produce a force in the member in opposition to operator actuating force on the pedal.

6. The tire changer of claim 5 wherein the pedal is pivoted to the member and the member moves with the pedal as the pedal is actuated to move the valve to the valve supply position.

7. The tire changer of claim 6 wherein the spring is telescoped about the member and wherein a collar is positioned over the member adjacent the spring, said collar being in the path of arm travel, movement of the arm through its path of travel bringing the arm into engagement with the collar, and further movement of the arm causing compression of the spring to produce forces in the member in opposition to the forces originally applied to the foot pedal to actuate the valve.

References Cited

UNITED STATES PATENTS 3,032,095  5/1962  Brosene et al. _____ 157—1.28
3,100,520  8/1963  May et al. _____ 157—1.24

TRAVIS S. McGEHEE, *Primary Examiner.*